July 25, 1933.　　　　　G. J. BLUM　　　　　1,919,323

SAW FRAME

Filed May 27, 1931

Inventor:
George J. Blum,
By Chindahl, Parker & Carlson
Attys.

Patented July 25, 1933

1,919,323

UNITED STATES PATENT OFFICE

GEORGE J. BLUM, OF CHICAGO, ILLINOIS, ASSIGNOR TO ARMSTRONG-BLUM MFG. CO., OF CHICAGO, ILLINOIS, A CORPORATION OF ILLINOIS

SAW FRAME

Application filed May 27, 1931. Serial No. 540,325.

The invention relates generally to power hacksaws and more particularly to a saw frame for such a hacksaw.

The general object of the invention is to provide a new and improved saw frame and supporting means therefor such that the frame may be easily reciprocated either when idling or when under a heavy feeding pressure.

Another object is to provide a saw frame of this character which is effectually supported against side thrusts laterally of the direction of feed.

A further object is to provide a saw frame of this character having supporting means in the form of lubricated antifriction bearings.

Still another object is to provide a saw frame of this character in which the supporting bearings are effectually enclosed to prevent the entrance of dirt therein.

Other objects and advantages will become apparent from the following description taken in connection with the accompanying drawing, in which.

Figure 1:
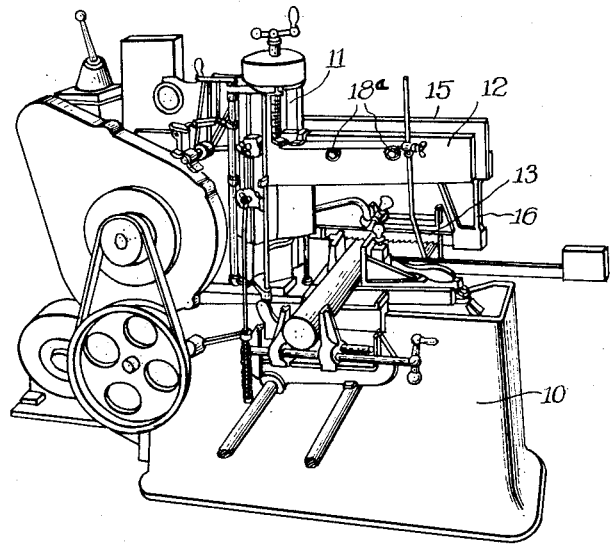
Figure 1 is a perspective view, on a reduced scale, of a power hacksaw having a saw frame embodying the features of the invention.
Figure 2:
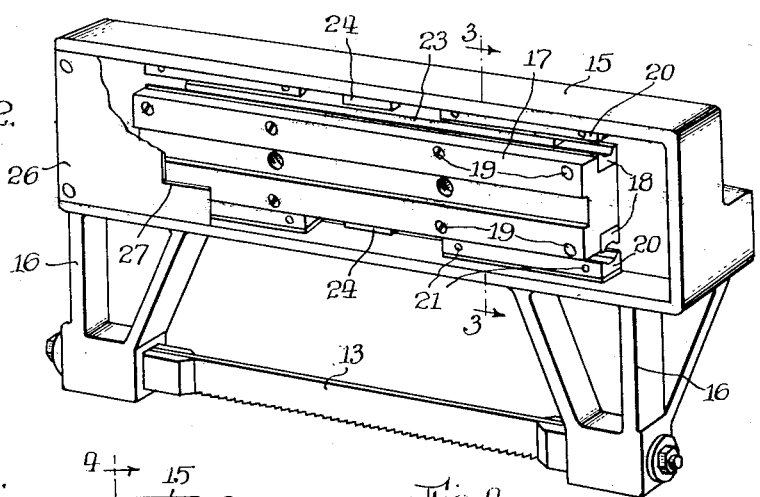
Fig. 2 is a perspective view, partially broken away, of the saw frame.
Figure 3:
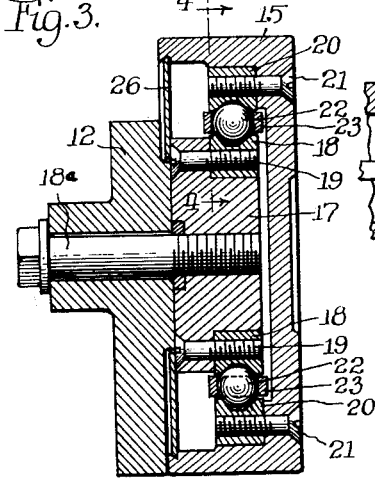
Fig. 3 is an enlarged vertical section taken on the line 3—3 of Fig. 2.
Figure 4:
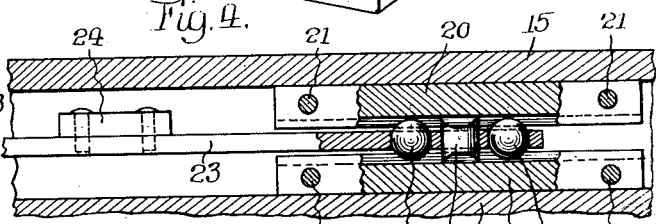
Fig. 4 is a fragmentary sectional view taken on the line 4—4 of Fig. 3.
Figure 5:
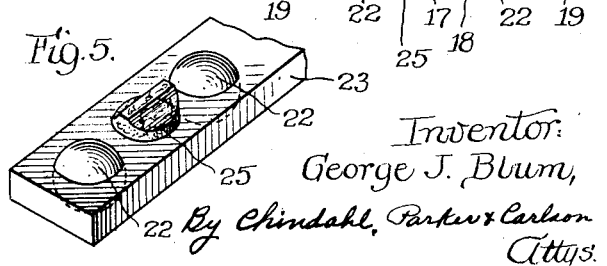
Fig. 5 is a fragmentary perspective view of a part of the device.

A saw frame embodying the features of the invention forms a part of a power hacksaw (Fig. 1) such as that disclosed and claimed in my copending application, Serial No. 479,268 filed September 2, 1930. The hacksaw shown therein comprises, briefly, a base 10 supporting an upwardly extending column 11 carrying a horizontally extending bracket or support 12 comprising a thin elongated plate of substantial width upon which is mounted the saw frame carrying a saw blade 13 for reciprocation relative thereto. The work to be cut is clamped on the base 10 and a relative feeding movement is effected between the blade 13 and the work piece.

The present invention provides a saw frame which is mounted on the bracket 12 through the medium of a slide member rigid with the bracket, and antifriction bearing elements arranged to travel lengthwise of the slide and cooperating therewith to support and guide the frame with a rolling action. To this end, the frame comprises an elongated body 15 in the form of a stiff hollow casing of rigid cast metal and relatively light in weight to permit high speeds of reciprocation with downwardly extending arms 16 forming a U-shape with the casing to which the saw blade 13 may be secured by means placing the blade under tension. The hollow body 15 is relatively thin, elongated and of substantial width, and is adapted to receive within it a supporting bar 17 of a length substantially less than the casing and forming the slide member, which bar is rigidly but detachably secured to the bracket 12 as by bolts 18$^a$. The casing comprises an outer side wall and opposed edge and end walls, and the blade 13 is disposed substantially in a median plane between opposite sides of the casing. The bolts 18$^a$ permit the casing and the slide with the bearings therebetween to be assembled as a unit and then mounted on the bracket.

While the frame of the machine illustrated herein is disposed for horizontal reciprocation, it is contemplated that the invention may be embodied in a frame disposed for vertical reciprocation.

The antifriction bearing elements are in sets and are mounted between the upper and lower edges of the slide 17 and the adjacent upper and lower walls of the body 15 adjacent the ends of the slide 17 and these elements are arranged in four sets to provide two longitudinally spaced upper bearings and two longitudinally spaced lower bearings. Each of said bearings comprises an outwardly facing raceway 18 secured in a groove in the slide as by screws 19, and an opposed inwardly facing raceway 20 is secured in a corner formed by an edge and the side wall of the body 15 as by screws 21 and is in closely spaced relation to the raceway 18. Interposed between each pair of raceways 19, 20 and fitting snugly therebetween is a plurality of bearing elements preferably in the form of balls 22, two such balls being shown in the present instance. The bearings are disposed with their centers substantially in the median plane of the casing, which includes the blade 13. It will be observed that by the arrangement employed, the bearings are spaced apart vertically as well as longitudinally so that the frame, while supported for free and easy reciprocation, is also effectually guided so as to be held firmly against side thrusts. In order better to sustain such side thrusts, the grooves in the raceways are made V-shaped in form. Thus, the bearings resist stresses at varying points in the plane of reciprocation and transversely thereof.

The invention also includes means for retaining the balls 22 within their respective raceways and in spaced relation to each other in a manner such as to permit the balls to travel longitudinally in the raceways, while preventing them from working out of the ends of raceways. As shown in the drawings, this means comprises strips of metal 23 extending one along each edge of the slide 17 between the raceways. Each strip 23 is perforated adjacent each end to receive freely the balls 22, the holes being spaced to hold each pair of balls in spaced relation to each other.

In the middle portion of each strip 23 is an abutment or stop member comprising preferably a block 24 secured to the strip 23 as by rivets. When the frame is at either end of its stroke, the block 24 is adapted to abut against the ends of the adjacent raceways 20, thus limiting the range of travel of the balls so as to maintain them in their proper longitudinal relation to the raceways.

To provide for lubricating the bearings, a plurality of oil-retaining felt pads 25 are secured in the strips 23 by being wedged in holes therethrough and shaped to wipe the surfaces of the grooves in the raceways. In the present embodiment, the pads 25 are positioned between the pairs of balls 22 and thus serve to lubricate each bearing.

The hollow body is closed to prevent the entry of dirt and grit into the bearings, by means of a removable cover plate 26 which is secured over the open side of the hollow body 15 and, in effect, constitutes a part of the casing. This plate is closely adjacent the slide and is centrally apertured, as at 27, to permit the attachment of the slide 17 to the bracket 12 and the reciprocation of the body 15 relative to the slide. The opening 27 is, however, of less width and length than the slide and is closed by the bracket 12 and the slide 17 overlapping the cover plate 26.

From the above description, it will be apparent that I have provided a saw frame which may be easily reciprocated under all operating conditions. When the saw is being fed toward the work but not yet in contact therewith, the bearings along the upper edge of the slide 17 support the weight of the frame and eliminate friction therebetween. When the saw is cutting under a heavy feeding pressure, the bearings along the lower edge of the slide 17 receive the load and permit the frame to be freely reciprocated. If the saw should strike a hard spot in the work and tend to be forced laterally, the vertically spaced bearings, coacting with the V-shaped grooves, guide the frame accurately and prevent any lateral movement thereof.

I claim as my invention:

1. In a power hacksaw, the combination of a support and a reciprocable saw-carrying frame having a relatively thin elongated casing of substantial width and having inwardly facing raceways at opposite longitudinal edges, a thin elongated slide member of a length substantially less than said casing and having at its opposite edges outwardly facing raceways in closely spaced relation to said inwardly facing raceways so as to form sets of raceways near opposite edges of the casing, a plurality of anti-friction bearing elements of small diameter fitted snugly between each set of raceways and engaging therewith so as to resist stresses both in the plane of reciprocation of the saw frame and transversely thereof, and means rigidly but detachably securing said slide member to said support, said casing having an elongated opening in one wall to expose the surface of the slide which is secured to the support and to permit reciprocation of the saw frame, and said slide having one face disposed closely adjacent said opening to close the same.

2. In a power hacksaw, the combination of a support, a reciprocable saw-carrying frame having a relatively thin elongated casing of substantial width and having inwardly facing raceways at opposite longitudinal edges, a thin elongated slide member of a length less than said casing and having at its opposite edges outwardly facing raceways in closely spaced relation to said inwardly facing raceways so as to form sets of raceways near opposite edges of the casing, a plurality of anti-friction bearing elements of small diameter fitted snugly between each set of raceways and cooperating therewith to resist stresses both in the plane of reciprocation of the saw frame and transversely thereof, and means for rigidly but detachably securing said slide member to said support, said casing including a cover plate detachably secured to one side thereof and having an elongated opening of a length substantially less than said slide member and of a width also less than said slide member, said opening serving to expose the portion of the slide member which is secured to said support and permitting of reciprocation of the saw frame, and said slide member having one face disposed closely adjacent said opening to close the same.

3. In a power hacksaw, the combination of a support comprising a thin elongated plate of substantial width, a reciprocable saw-carrying frame having a relatively thin elongated casing also of substantial width and having inwardly facing raceways at opposite longitudinal edges, a thin elongated slide member of a length less than said casing and having at its opposite edges outwardly facing raceways in closely spaced relation to said inwardly facing raceways of the casing so as to form sets of raceways near opposite edges of the casing, a plurality of anti-friction bearing elements of small diameter fitted snugly between each set of raceways and spaced apart longitudinally of the raceways, said bearing elements cooperating with said raceways to resist stresses both in the plane of reciprocation of the saw frame as well as transversely thereof, and means for rigidly but detachably securing said slide to said supporting plate, said casing having an elongated opening in one wall through which the slide member is connected to said supporting plate, said opening being smaller in size than said slide member with the outer face of the slide member disposed closely adjacent to and overlapping the inner edges of said opening, and said supporting plate also being of a size larger than said opening and overlapping the outer edges thereof.

4. In a power hacksaw, the combination of a support, a reciprocable saw-carrying frame having a relatively thin elongated casing of substantial width and a pair of arms projecting from opposite ends of the casing adapted to support a saw blade at their free ends with the saw blade disposed substantially in a median plane between opposite sides of the casing, said casing having inwardly facing V-shaped raceways adjacent the ends of opposite longitudinal edges with their centers disposed substantially in said median plane, a thin elongated slide member of a length less than said casing and having at its opposite edges outwardly facing raceways in closely spaced relation to said inwardly facing raceways so as to form sets of raceways near opposite edges of the casing, a plurality of anti-friction bearing balls fitted snugly between the raceways and spaced apart longitudinally thereof, said bearing balls cooperating with said raceways to resist stresses both at varying points in the plane of reciprocation of the saw frame and transversely thereof, and means for mounting on said support the frame and slide member assembled as a unit.

5. In a power hacksaw, the combination of a slide member comprising a rigid elongated block of substantial width, an elongated reciprocable casing of a width and thickness greater than said block and including a rigid casting having an outer side wall and opposed edge and end walls and a cover plate detachably secured to said casting, raceways fitted into said casting into the corners formed by said edge and side walls, means securing said raceways in position in the casting, said block having grooves in its opposite longitudinal edges, inner raceways fitted into said grooves in the block and rigidly secured thereto, and anti-friction bearing elements fitted snugly between the sets of raceways thus formed, said bearing elements and the cooperating raceways being shaped to resist lateral stresses as well as stresses in the plane of reciprocation of the casing.

6. In a power hacksaw, the combination of a support mounted for movement toward and from the work, a U-shaped saw frame having a thin elongated yoke member of substantial width and rigid depending arms at opposite ends of the yoke member adapted to support a saw blade at their free ends, and a bearing structure for said frame comprising outer raceways disposed in the cutting plane and rigidly supported by said yoke member, said outer raceways providing inwardly facing V-shaped bearing surfaces at opposite longitudinal edges of the yoke member and spaced apart in the direction of reciprocation, inner raceways rigidly mounted at one side of said support in said cutting plane and providing outwardly facing V-shaped bearing surfaces in opposed relation to said inwardly facing surfaces of the outer raceways, bearing balls fitted snugly between the opposed V-shaped bearing surfaces, and means for retaining the bearing balls in position in their respective raceways.

7. In a power driven hacksaw, a blade carrying frame comprising a rigid elongated casing of substantial width, with an elongated opening in one side, and means reciprocably supporting said frame and coacting with said casing to maintain said opening closed in the reciprocation of the frame, said means including anti-friction bearings spaced apart longitudinally of the casing and also in the cutting plane and adapted to resist strains both in said plane and transversely thereof.

8. In a power driven hacksaw, a blade carrying frame having a rigid elongated casing of substantial width, with an elongated opening in one side, and means reciprocably supporting said frame including an elongated supporting member having a substantially flat face of a length greater than said opening and operating to maintain said opening closed in the reciprocation of the frame, and anti-friction bearings in the casing spaced apart longitudinally thereof and also in the cutting plane and adapted to resist strains both in said plane and transversely thereof.

GEORGE J. BLUM.